United States Patent [19]
Cody

[11] 3,859,349

[45] Jan. 7, 1975

[54] PURIFICATION OF HYDROXYACETIC ACID

[75] Inventor: Nicholas Francis Cody, Charleston, W. Va.

[73] Assignee: E. I. du Pont de Nemours and Company, Wilmington, Del.

[22] Filed: Feb. 15, 1973

[21] Appl. No.: 332,578

[52] U.S. Cl............................................. 260/535 R
[51] Int. Cl............................................... C07c 59/06
[58] Field of Search ................................ 260/535 R

[56] References Cited
UNITED STATES PATENTS
3,202,705    8/1965    Powell............................ 260/535 R Primary Examiner—Lorraine A. Weinberger
Assistant Examiner—Paul J. Killos

[57] ABSTRACT

Crude hydroxyacetic acid made by the carbonylation reaction of formaldehyde and water in the presence of an organic acid and sulfuric acid is purified by the following steps. The crude acid is first treated with granulated activated carbon for decolorization, then treated in a weak anion resin column to remove the sulfuric acid, subjected to live steam stripping to remove low-boiling impurities, and finally treated with a cation exchange resin to remove metals present, e.g., iron or copper.

5 Claims, 1 Drawing Figure

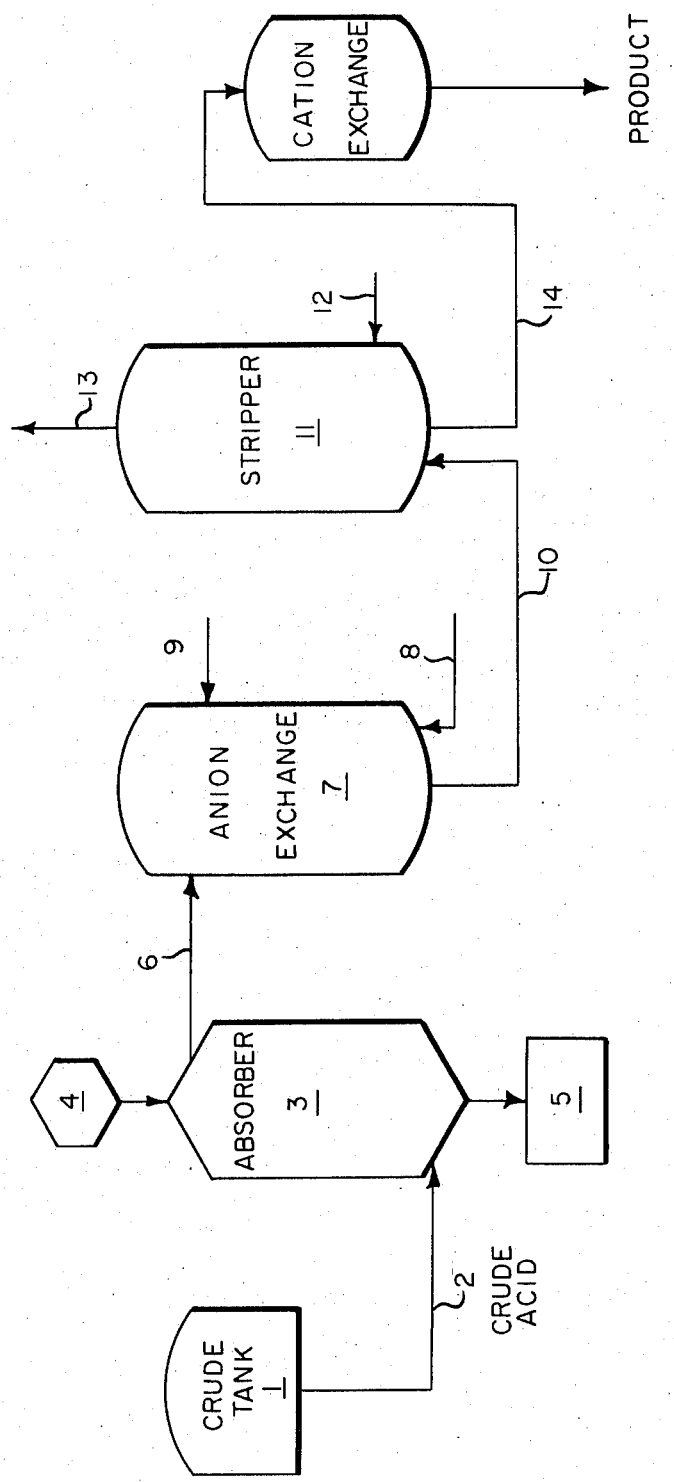

PURIFICATION OF HYDROXYACETIC ACID

BACKGROUND OF THE INVENTION

Hydroxyacetic acid is a useful commercial acid which is typically used to remove milkstone, to polish metals, and to remove corrosion from pipes.

Hydroxyacetic acid can be synthesized by the carbonylation of formaldehyde and water in an organic acid, usually hydroxyacetic, with sulfuric acid as a catalyst at pressures between 6,000 and 10,000 psig, preferably 7,000 psig and temperatures of 210° to 240° C., preferably 220° C. This carbonylation process is well known and is described in U.S. Pat. Nos. 2,153,064; 2,152,852 and 2,037,654. This process produces a crude hydroxyacetic acid which must be purified prior to use or sale.

The crude hydroxyacetic acid made by the above carbonylation process will have the following typical composition in weight percent:

| | |
|---|---|
| hydroxyacetic acid | 85 % |
| formic acid | 1.5 |
| sulfuric acid | 1.5 |
| formaldehyde | 1.5 |
| water | 10.0 |
| methanol | 0.5 |

The crude acid will also have dark color, i.e., a Gardner No. of around 15.

Such crude hydroxyacetic acid is presently purified by a four-step process. In the process the crude acid is treated with calcium carbonate to precipitate the sulfuric acid present as calcium sulfate. The filtrate is then dehydrated to remove the low boilers, i.e., formic acid, formaldehyde and methanol. The crude acid is then digested in an aqueous solution or slurried powdered carbon for hydrolysis and decolorization. Finally the crude acid is passed through a cation exchange unit to produce refined hydroxyacetic acid.

BRIEF SUMMARY OF THE INVENTION

I have discovered an improved method for purifying this crude hydroxyacetic acid. In this method the crude acid is first decolorized by being contacted with granulated activated carbon in a pulsed or fixed bed, the pulsed bed being preferred. This step changes the Gardner No. of the crude acid from about 15 to less than 5. The spent carbon from this step can be burned for energy or regenerated.

The decolorized crude acid is then contacted with a weak anion exchange resin where the sulfuric acid is removed from the crude acid. The resin can be regenerated with ammonium hydroxide or sodium hydroxide.

The crude acid is then fed to a stripper where the low boiling impurities, i.e., formic acid, formaldehyde and methanol are removed at temperatures of 110° to 120° C. Thereafter, if desired, the acid can be treated with a cation exchange resin to remove trace metals, e.g., iron and copper.

The process of the invention has several advantages over the art purification process. It requires less in investment and operating costs and alleviates pollution problems.

DESCRIPTION OF THE DRAWING

The drawing is a flow chart of the process of the invention.

DETAILED DESCRIPTION OF THE INVENTION

As previously stated the process of the invention is useful to purify any hydroxyacetic acid made by the carbonylation of formaldehyde and water in the presence of an organic acid and sulfuric acid. In the specification and claims such acid is referred to as "crude hydroxyacetic acid."

The crude hydroxyacetic acid is first decolorized with granular activated carbon. This can be conducted in a fixed bed, particularly an in series fixed bed, but preferably it is conducted in a moving bed, i.e., a pulsed bed. If desired to reduce viscosity the crude acid can be diluted prior to being contacted with the activated carbon, i.e., diluted to 60–70% hydroxyacetic acid.

The decolorization step can be conducted at ambient temperatures, i.e., 25° to 30° C. Elevated temperatures can be employed, however, they are not necessary.

In the FIGURE a pulsed bed operation is illustrated. The crude hydroxyacetic acid flows from a storage tank 1 through conduit 2 to the bottom of absorber 3. The absorber is packed with activated granular carbon. The amount of carbon is not critical, it will depend upon how often the unit is to be purged. At scheduled times a measured amount of spent carbon is dropped from the absorber into a tank 5. When this occurs, the same amount of new carbon slurried in hydroxyacetic acid is admitted into the absorber from the charge tank 4. The rate of pulsing is not critical and can range from 0.0025 to 0.0070 pounds per pound of crude feed, normally about 0.0058 pounds per pound of crude acid. An easy way to determine pulsing frequency is to obtain samples of the absorber effluent and measure its color level.

While the crude acid is moving through the absorber its Gardner Number will be changed from 12 to 18 to less than 5, i.e., a light straw color. This color change is brought about by the carbon absorbing the color forming impurities present in the crude, i.e., various high molecular polymers or tars formed during the manufacture of the crude acid. In operation the contact time is not critical can be approximately 1 to 5 gallons/cu. ft./min. for most operating conditions.

The decolorized crude acid 6 leaves the top of the absorber and is fed into the top of an anion exchange column 7 wherein the sulfuric acid present in the crude acid is removed. This column will be packed with a weak anion exchange resin. A suitable resin is Rohm & Haas, "Amberlite" Anion Exchange Resin IRA-68, having an acrylate-divinyl benzene copolymer structure and a tertiary amine functionality. Other weak anion exchange resins which could be used are Rohm & Haas, "Amberlite" Anion Exchange Resin IRA-94 (Macroreticular type resin) and more preferable microreticular (Gel type) resins which have good absorption capabilities and have good strength characteristics such as Rohm & Haas, IRA-47 gel type polyamine structure and Rohm & Haas, IRA-45 gel type styrene-divinyl benzene copolymer.

In using the weak base ion exchange resins (both macroreticular and preferably the microreticular type) in the process of the invention it was discovered that one half of the sulfuric acid molecular in the crude attaches on to the resin as sulfuric acid and the other half as a bisulfate. When the resin bed is rinsed with water prior to its regeneration, the bisulfate portion is readily washed out of the bed and hydrolyzed to sulfuric acid.

The portion that was attached to the resin as sulfuric acid is held by the resin and must be removed by ammonia or caustic. The water rinse containing the hydrolyzed bisulfate creates a disposal problem. If it is recycled to the process, it creates an additional acid load. If it is discharged into the sewers it creates a possible environmental problem.

Accordingly the bed volume of the weak base ion exchange resin is designed so that its absorption is interrupted at approximately 50% of its capacity. Then when the initial water rinse dislodges the bisulfate and hydrolyzes it to sulfuric acid, the remaining active resin absorbes this sulfuric acid. The interruption need not be at exactly 50%, i.e., the absorbtion can continue until about 33% of the bed remains in the active form. However, 50% is preferred as it will leave approximately 25% of the resin bed in the active form to provide for a margin of error.

The anion exchange column can be operated at ambient temperatures, 25°–30° C. and at atmospheric pressure. Other temperatures or pressures can be employed, but they are not necessary.

When the resin bed has been exhausted to the desired level, e.g., 50%, it can be regenerated in place. This is accomplished by first rinsing the bed with water and then feeding water and ammonia or caustic 8 into the bottom of the column while agitating the resin bed with a nitrogen sparge 9. This procedure is continued until the regeneration is complete. The bed is then rinsed with water to remove excess NHaOH or caustic and treated with refined hydroxyacetic acid to return the resin to the desired form. The ammonium sulfate created during the regeneration step can be disposed of in several ways, i.e., burned to produce $SO_2$ as described in the process of U.S. Pat. No. 3,419,601 to Isbell.

The effluent from the ion exchange 10 will be fed into a stripper 11. When the temperature or the effluent is at the boiling point, 110° to 120° C., live steam 12 will be sparged into the stripper. The vapors coming off the top of the stripper 13 will contain the low boiling impurities. These vapors can be condensed and then disposed of in any suitable manner. The bottoms of the stripper 14 will be sent through a cation exchange unit to remove trace metals. The effluent from this unit is refined hydroxyacetic acid and it can be pumped through a conduit to storage.

The temperature of the live steam stripping will generally be between 110° and 120° C. The temperature depends upon the acid strength, i.e., with 20% acid a temperature of 110° C. can be employed. The ratio of steam to crude acid to provide the desired stripping will be about 1.5 pounds of steam per pound of acid.

The cation exchange column contains any cation exchange resin useful to remove trace metals, particularly iron to 10 ppm maximum and copper to 5 ppm maximum. This column can be operated at ambient temperatures, i.e., 25° to 30° C., and atmospheric pressure. The resin can be regenerated by treatment with sodium chloride followed by sulfuric acid.

The following Example is offered to illustrate the process of the invention.

The following Example is offered to illustrate the process of the invention.

A crude hydroxyacetic acid at 30° C. composed of 61.5% by weight hydroxyacetic acid, .9% by weight sulfuric acid, 35.3% water, .9% formaldehyde, .9% formic acid and .5% organics is fed into an absorber 3. The absorber has a 5-foot diameter by 30-foot high bed of activated carbon which is pulsed every 3 days. The absorber operates at atmospheric pressure. The volumetric flow rate of the crude acid through the absorber is 0.13 bed volumes per hour.

The crude acid entering the absorber has a Gardner No. of 15 and when it leaves it has a number of 4.

The decolorized crude acid is then fed into the weak anion exchange column 7. This column operates at 30° C. and atmospheric pressure. The column is packed with 185 cu. ft. of "Amberlite" Anion Exchange Resin IRA-68. This column removed all the sulfuric acid present in the crude acid. The column has a useful sulfuric acid loading capacity of 1,000 lbs. The column is then regenerated in about 2.5 hours, thus the column has a 24 hour cycle. This cycle will vary in accordance with the crude flow rate and the sulfuric acid concentration.

The crude acid from the ion exchange is then live steam stripped 11 at 112° C. and atmospheric pressure to remove volatile impurities from the hydroxyacetic acid. The steam is fed into the stripper at 150 psig and at a ratio of 1.5 pounds of steam per pound of hydroxyacetic acid.

The stripped acid is next passed through the cation exchange column to remove the trace metals. The column operates at 30° C. and atmospheric pressure and is packed with 60 cu. ft. of "Dow-50" cation resin. The effluent from the cation exchange column is refined hydroxyacetic acid.

I claim.

1. A method for purifying crude hydroxyacetic acid, synthesized by the carbonylation of formaldehyde and water in an organic acid with sulfuric acid as a catalyst, characterized in that the crude acid is decolorized by being contacted with a bed of granulated activated carbon, then sulfuric acid is removed from the crude acid by contacting it with a weak anion exchange resin to absorb the sulfuric acid, and the low-boiling impurities are then removed by live steam stripping at temperatures of 110° to 120° C.

2. The method of claim 1 wherein the granulated activated carbon is in a pulsed bed.

3. The method of claim 1 wherein the acid from the live steam stripping is treated with a cation exchange resin for the removal of metal impurities.

4. The method of claim 3 wherein the absorbtion of the sulfuric acid by the weak anion exchange resin is interrupted while at least 33% of the resin remains in the active form.

5. The method of claim 4 wherein about 50% of the resin remains in the active form.

* * * * *